United States Patent
Peretz et al.

(10) Patent No.: US 8,417,791 B1
(45) Date of Patent: Apr. 9, 2013

(54) HOSTED CALLING SERVICE

(75) Inventors: Ervin Peretz, Redmond, WA (US);
Jennifer W. Braithwaite, Lynnwood, WA (US); Scott R. Ludwig, Kirkland, WA (US)

(73) Assignee: Google Inc., Mountain View, CA (US)

( * ) Notice: Subject to any disclaimer, the term of this patent is extended or adjusted under 35 U.S.C. 154(b) by 1368 days.

(21) Appl. No.: 11/480,279

(22) Filed: Jun. 30, 2006

(51) Int. Cl.
*G06F 15/16* (2006.01)

(52) U.S. Cl.
USPC ........... 709/217; 709/218; 709/219; 705/325; 379/201.02

(58) Field of Classification Search .................... None
See application file for complete search history.

(56) References Cited

U.S. PATENT DOCUMENTS

| | | | | |
|---|---|---|---|---|
| 5,499,288 A * | 3/1996 | Hunt et al. | ........ | 379/88.02 |
| 5,535,375 A * | 7/1996 | Eshel et al. | ........ | 703/27 |
| 5,841,966 A * | 11/1998 | Irribarren | ........ | 709/206 |
| 5,986,565 A | 11/1999 | Isaka | | |
| 6,104,787 A | 8/2000 | Paris | | |
| 6,195,542 B1 | 2/2001 | Griffith | | |
| 6,466,917 B1 * | 10/2002 | Goyal et al. | ........ | 705/18 |
| 6,621,896 B1 | 9/2003 | Rinn | | |
| 6,747,970 B1 * | 6/2004 | Lamb et al. | ........ | 370/352 |
| 6,782,080 B2 | 8/2004 | Leivo et al. | | |
| 6,845,356 B1 * | 1/2005 | Epstein | ........ | 704/235 |
| 6,934,858 B2 | 8/2005 | Woodhill | | |
| 7,103,372 B1 | 9/2006 | Kupsh | | |
| 7,231,029 B1 | 6/2007 | Kirkpatrick | | |
| 7,308,484 B1 * | 12/2007 | Dodrill et al. | ........ | 709/218 |
| 7,317,716 B1 | 1/2008 | Boni et al. | | |
| 2002/0126818 A1 | 9/2002 | Cai et al. | | |
| 2003/0099332 A1 | 5/2003 | Parsa | | |
| 2004/0127241 A1 | 7/2004 | Shostak | | |
| 2004/0136515 A1 | 7/2004 | Litwin, Jr. | | |
| 2004/0165707 A1 | 8/2004 | Raymond | | |
| 2004/0199597 A1 | 10/2004 | Libbey et al. | | |
| 2005/0048998 A1 | 3/2005 | Zhu | | |
| 2005/0107067 A1 | 5/2005 | Redecker | | |
| 2005/0245257 A1 | 11/2005 | Woodhill | | |
| 2005/0246427 A1 | 11/2005 | Ishii | | |
| 2006/0026242 A1 | 2/2006 | Kuhlmann et al. | | |
| 2006/0029190 A1 | 2/2006 | Schultz | | |
| 2006/0053296 A1 * | 3/2006 | Busboom et al. | ........ | 713/182 |
| 2006/0133593 A1 | 6/2006 | Moss et al. | | |
| 2006/0147014 A1 | 7/2006 | Smith et al. | | |
| 2006/0199572 A1 | 9/2006 | Chin et al. | | |
| 2006/0218407 A1 * | 9/2006 | Toms | ........ | 713/182 |
| 2006/0222166 A1 * | 10/2006 | Ramakrishna et al. | .. | 379/265.09 |
| 2008/0279359 A1 | 11/2008 | Tiliks et al. | | |

OTHER PUBLICATIONS

Echopass Corporation, "Presenting the Echopass EchoSystem," Pleasanton, CA, Apr. 2006, 4 pages.

* cited by examiner

*Primary Examiner* — Thomas Dailey
*Assistant Examiner* — Nam Tran
(74) *Attorney, Agent, or Firm* — Fish & Richardson P.C.

(57) ABSTRACT

A computer-implemented method for calling a party using a hosted calling service is disclosed. The method includes receiving at a calling module, using a standardized interface, a call request from a remote client, the standardized interface enabling interoperability between the calling module and heterogeneous remote clients, generating a call to a party specified by the call request, and transmitting a response received from the party to the remote client for client-specific processing.

22 Claims, 5 Drawing Sheets

HOSTED CALLING SERVICE

RELATED APPLICATIONS

This application is related to co-pending and jointly-owned U.S. patent application Ser. No. 11/479,943 entitled, "Crank Call Avoidance," by Peretz, et al., filed Jun. 30, 2006.

TECHNICAL FIELD

The instant specification relates to calling systems and, in particular, to a hosted calling service accessible to client systems.

BACKGROUND

As the Internet has increased in popularity, user demand for web and web-related services has grown. Certain current systems that provide web-related services may authenticate users requesting the services in order to prevent abuse of the systems. For example, a user attempting to register for an email account may be prompted to enter text in a GUI in response to a displayed CAPTCHA (completely automated public Turing test to tell computers and humans apart) test. The test may eliminate some abuses by bots imitating human users, but may be ineffective in preventing human users from abusing the web services.

Other systems that provide web-related services may authenticate users requesting the services by requesting the users record information displayed on the screen. The system may then send the user mail through the postal service and require the user to fill in a form using the previously recorded information. While this may provide a disincentive to malicious or mischievous users who attempt to abuse the system, it may be inconvenient and slow for legitimate users.

SUMMARY

The instant specification discloses methods and systems for accessing and using a hosted calling system.

In one implementation, a computer-implemented method for calling a party using a hosted calling service is disclosed. The method comprise receiving at a calling module, using a standardized interface, a call request from a remote client, the standardized interface enabling interoperability between the calling module and heterogeneous remote clients, generating a call to a party specified by the call request, and transmitting a response received from the party to the remote client for client-specific processing. The client-specific processing may comprise verifying, based on the response, an identify of a user of the remote client. The method may also include receiving information from the remote client used to modify the call to the party, the information being based on the client-specific processing of the response transmitted to the remote client. The information may specify that the calling module should play a different message during the generated call from a currently played message. Also, the information may specify the calling module should terminate the call.

In some aspects, the response received from the party may comprise a dual tone multifrequency (DTMF) response. The method may also then comprise translating the DTMF response to text before transmitting it to the remote client. Alternatively or in addition, the response received from the party may comprises a verbal response. The method may, in such a situation, further comprise translating the verbal response to text before transmitting it to the remote client.

In some aspects, the call request may comprise an identifier for a recorded message to be played to the party. The method may then also include retrieving the recorded message from a storage location using the identifier. Also, the call request may comprise a recorded message to be played to the party, or a telephone number of the party to be called. The remote client may be a web server that prompts users to enter information used in generating call requests.

In other aspects, the method may further comprise receiving from the remote client a status request that prompts the calling module to transmit the response. Also, the method may include transmitting information in response to the status request, the information specifying whether or not the generated call was terminated. The transmitted response may comprise information not previously transmitted to the remote client.

In another implementation, a system for calling a party on behalf of a remote client is disclosed. The system comprises a standardized client interface configured to receive call requests from heterogeneous remote clients, means for generating a call to a party associated with a call request, and a calling interface to format responses by the party for transmission to a remote client for client-specific processing.

In yet another implementation, a system for enabling a remote client to use a hosted service to call a party is disclosed, and comprises a call control module at a remote client to generate a call request for transmission to a standardized interface of a server, which enables the server to accept call requests from heterogeneous remote clients, the call request specifying a party to be called by the server, an interface at the remote client to receive from the server a response by the party, and a processing module at the remote client to process the response.

In another implementation, a computer program product tangibly embodied in an information carrier is discussed. The computer program product includes instructions that, when executed, perform operations for contacting a party on behalf of heterogeneous remote clients. The operations comprise receiving at an interface a call request from a remote client, the interface enabling interoperability between a calling module and heterogeneous remote clients, calling a party specified by the call request, and transmitting a response received from the party to the remote client for client-specific processing.

The systems and techniques described here may provide one or more of the following advantages. First, a system may reduce the complexity of clients by enabling a server to provide calling services to heterogeneous remote clients through a standardized interface. The system can remain very flexible, however, because the server can pass responses generated as a result of the calling services to a remote client for client-specific processing. Second, a system may provide a more convenient user interface for particular user or in particular situations. Third, a system can permit a remote client quickly to verify an identity of a user requesting web services using a method that is difficult to falsify.

The details of one or more embodiments of the hosted calling feature are set forth in the accompanying drawings and the description below. Other aspects and advantages of the hosted calling feature will be apparent from the description and drawings, and from the claims.

DESCRIPTION OF DRAWINGS

Like reference symbols in the various drawings indicate like elements.

DETAILED DESCRIPTION

Figure 1:
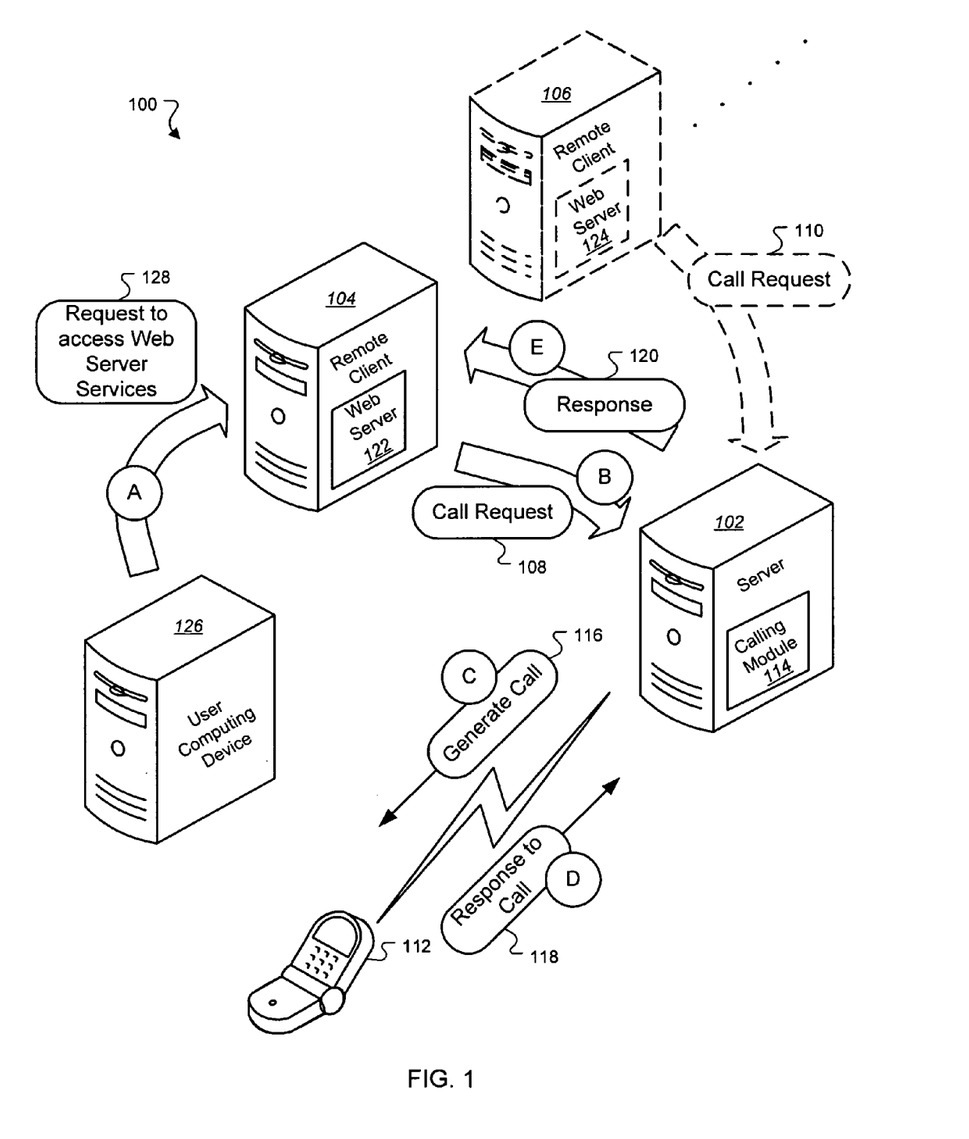
FIG. 1 is a schematic diagram of an example system for providing hosted calling services.

FIG. 1 is a schematic diagram of an example system for providing hosted calling services. The system 100 includes a server 102 and one or more clients, such as remote clients 104, 106. The server 102 can include a standardized interface (e.g., a hypertext transfer protocol (HTTP) interface or an extensible markup language protocol (XMLP) interface) which accepts and transmits messages with the remote clients 104, 106.

An exchanged message can include a call request 108 transmitted from the remote client 104 to the server 102. The call request can specify content information, such as a cellular telephone number, for the server 102 to call. The server can use the content information to generate a telephone call to a cellular telephone 112 identified by the content information.

The server 102 can also transmit, via the standardized interface, received responses from the calls placed to the remote clients 104, 106. For example, the server 102 can receive verbal responses from the generated calls. The server 102 can include a voice to text converter to convert the received verbal responses into text and transmit the text to the remote clients 104, 106. In another example, the server 102 can receive dual-tone multifrequency (DTMF) responses from the calls. The server can use a DTMF decoder, which decodes the DTMF responses, and the server can then transmit the decoded responses to the remote clients 104, 106. After receiving the responses from the server 102, the remote clients 104, 106 can execute client—specific processes on the received responses.

In one implementation, one or more of the remote clients 104, 106 are heterogeneous. A heterogeneous client may include different hardware or software and operate on the received call responses differently from other clients. Additionally, heterogeneous clients may be located on different intranets and connected through a public network, such as the internet. Also, the heterogeneous clients may be operated or owned by different entities. However, by using the standardized interface, the remote clients 104, 106 can each access the hosted calling services provided by the server 102 in spite of the clients' heterogeneous nature.

As shown in FIG. 1, the server 102 can receive call requests 108, 110 from the remote clients 104, 106. In some implementations, the call requests 108, 110 include a phone number of a designated phone, such as the cellular telephone 112. Upon receiving the call requests 108, 110, the server 102 can use a calling module 114 to generate a call 116 to the designated phone 112. In some implementations, the call requests 108, 110 can also include an audio file and/or an identifier (e.g., a Uniform Resource Identifier (URI)), which specifies a path to the audio file.

The calling module 114 can play the specified audio file after a call has been established with the phone 112. Additionally, the calling module 114 can gather a response 118, such as a verbal response or a disconnection of the call, from the user. The server 102 can format the response 118 into a message compatible with the standardized format (e.g., encapsulated in HTTP calls) and transmit the formatted response 120 back to the remote client 104 that initiated the call request 108.

The remote clients 104, 106 can include web servers 122, 124, which can receive formatted responses from the server 102. The web servers 122, 124 can also receive HTTP requests from a user computing device 126. As shown in FIG. 1, the user computing device 126 can send a request 128 to access web server services (e.g., web browsing services, email services, file transfer protocol (FTP) services, etc.) available from the remote client 104.

In certain implementations, the web server 122 may provide services that require validation of the requesting user's identity. For example, the web server 122 may provide an online ticket sale service and the web server 122 may require a validation of a buyer's identity to avoid abuse of the service.

In another example, the web server 122 may validate an identity of a user when the user is registering a digital advertisement for a local business, where the advertisement is displayed, for example, with related search results in response to a query transmitted to a search engine.

In order to ensure that the entered information is valid (e.g., not bogus information entered by a mischievous or malicious user), the web server 122 can require the user to "uniquify" him or herself. In one implementation, the server 122 uniquifies the user by prompting the user for a unique phone number, and the server validates whether the user actually has access to the provided phone number. Uniquifying a user may prevent a single user from entering bogus information multiple times. Additionally, the above-described implementation may serve as a disincentive for a user to enter phony information because a contact number for the user is submitted as part of the registration process.

In some implementations, the web server 122 uses calling services hosted by the server 102 to contact the user requesting services from the remote client. For example, the user computing device 126 can send the request 128 to the web server 122 to register a business, as shown by an arrow labeled A. Upon receiving the request 128, the web server 122 can prompt the user to enter a phone number.

After receiving the phone number, the remote client 104 can generate a call request that includes the phone number. The remote client can transmit the call request to the server 102 (as shown by an arrow labeled B), and the server can call (as indicated by an arrow labeled C) the cellular telephone 112, which is identified using the phone number entered by the user.

In certain implementations, the remote client 104 can control the aspects of the call 116, such as the audio file being played, via the standardized interface. This functionality is described in more detail below in association with FIGS. 2 and 3.

The phone 112 can send the user's response 118 back to the server 102, as shown by an arrow D, and the server 102 can format the response 118. For example, the response may be a verbally spoken response from the user. The server 102 can format the response 118 so that it is converted from voice to text. The server 102 can then send the formatted response 120, as shown by an arrow labeled E, back to the remote client 104 using the standardized interface.

Once the user's response is received by the remote client 104, the client can perform client specific processing on the response. For example, the remote client 104 can check if the received response corresponds to an expected response (e.g., a given personal identification number (PIN) matches a previously stored PIN) and, if so, the remote client 104 may authorize the user to access its web services.

Figure 2:
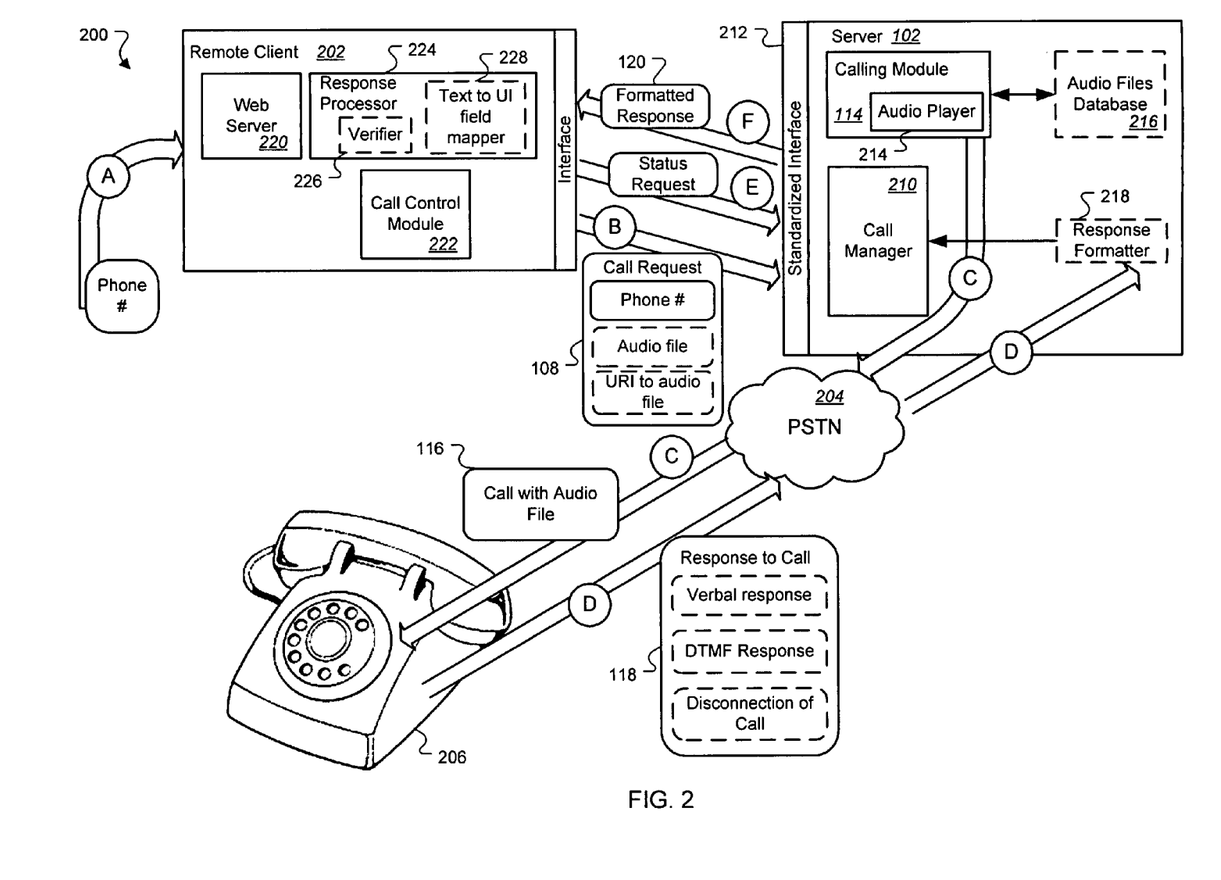
FIG. 2 is a block diagram of portions of the system of FIG. 1 shown in more detail.

FIG. 2 is a block diagram of portions of the system 100 of FIG. 1 shown in more detail. System 200 of FIG. 2 includes a remote client 202 and a public switched telephone network (PSTN) 204. The remote client 202 can send call requests to the server 102 to call a designated phone 206 using the PSTN 204. Through the PSTN 204, the server 102 can receives responses from the phone 206. The server 102 can then transmit the responses to the remote client 202 via a standardized interface 212.

In the depicted example, the server 102 includes the calling module 114, a call manager 210, and the standardized interface 212. The calling module 114 can be configured to generate PSTN calls. The calling module 114 can also include an audio player 214. During a call, the calling module 114 can use the audio player 214 to play a specified audio file to the phone 206 via the PSTN 204.

In some implementations, the server 102 can optionally include an audio file database 216 that stores audio files for playback. For example, the server 202 can permit the remote client 202 to store one or more audio files in the database 216. When the remote client 202 generates a request, the client may include an identifier that specifies a location in the database 216 at which the audio file is stored. After receiving the request, the calling module 114 can use the identifier to retrieve the specified audio file from the database 216.

The call manager 210 can handle the transmission and reception of messages to and from the remote client 202. For example, the call manager 210 can interpret a call request received from the remote client 202 and can extract a phone number and a path specified in the call request. In another example, the call manager 210 can also encapsulate a response received from the phone 206 in a message that can be transmitted (e.g., using HTTP) by the standardized interface 212.

In another example, the call manager 210 can handle control requests from the remote client 202 during a call. During the call, the remote client may request the server 102 to, for example, disconnect the call, play another audio file, or report a status of the call. Exemplary methods for handling requests from the remote client 202 are described in association with FIG. 3.

In some implementations, the server 102 can optionally include a response formatter 218. The response formatter 218 can format responses received from the phone 206 into standard computer data representation (e.g., plain text in American Standard Code for Information Interchange (ASCII) characters, binary characters, etc.). For example, the server 102 can receive verbal responses from the phone 206. The response formatter 218 can include a voice recognition algorithm to convert verbal response to text. In another example, if the phone 216 is a touch tone phone, a user of the phone 216 can select a key on a keypad of the phone to transmit a DTMF response to the server 102. The response formatter 218 can include a DTMF decoder, which decodes the DTMF response to determine which key the user has selected.

In the depicted example, the remote client 202 includes a web server 220, a call control module 222, and a response processor 224. The web server 220 can collect a call back number from a user, for example, via a web interface displayed on a web browser. The web server 220 can pass the call back number to the call control module 222 to initiate a call request using the number.

In another example, the web server 220 stores the phone number in a database (not shown), and the call control module 222 retrieves the phone number from the database at a later specified time and initiates the call request. The user can enter the later specified time at substantially the same time that the user enters the phone number for call back, and the remote client 202 can include the time in the call request transmitted to the server 102. In other implementations, the later specified time is a preconfigured delay (e.g., ten minutes) stored as a variable by the server.

In certain implementations, the remote client 202 sends a call request that includes an identifier that are not telephone numbers. For example, the device 206 may be a computing device with audio or visual communication capabilities. The call request may include an internet protocol (IP) address of the computing device instead of a phone number.

In other implementations, the remote client 202 sends an identifier (e.g., a URI, database key, etc.) that the server 102 uses to retrieve a previously stored telephone number from a database. The server 102 or the remote client 202 can encrypt any transmitted telephone numbers to protect a user's privacy. If the remote client 202 encrypts the telephone numbers, which are transmitted and stored at the server, the client 202 can transmit an de-encryption key in the call request, so that the server can decrypt the information and initiate a call to the identified device.

The response processor 224 can perform client-specific processing when the remote client 202 receives responses from the server 102. In certain implementations, the response processor 224 includes a verifier 226 and a text to user interface (UI) field mapper 228. The verifier 226 can verify a user's identify by, for example, comparing a stored personal identification number (PIN) associated with a user with a PIN provided as a response.

The text to UI field mapper 228 can map information included in the user's response to the call and insert it into appropriate fields in a UI that may be displayed to the user by the user computing device 126. For example, the server 102 may call the telephone device 206 and play a query asking a user of the device 206 to speak the address information the user desires to enter.

The server 102 can capture, format, and transmit this information to the remote client 202. The text to UI field mapper 228 of the remote client 202 can map the address information into an address field in a form on the UI that may or may not be displayed to the user. For example, the server 102 can receive a verbal response including address information "5000 Dain Rauscher Plaza, 60 South Sixth Street, Minneapolis, Minn. 55402." The response formatter 218 can convert the voice into text and transmits the converted text to the remote client 202, which uses the mapper 228 to insert the information into an address field.

In certain implementations, the text to UI field mapper 228 parses the text into street address, city, state, and zip code by searching for keywords, such as "street" and "Minnesota." For example, the text to UI mapper 228 determines that the address before the word street is mapped into the street address field. In another example, the text to UI mapper 228 recognizes the word "Minnesota" identifies a state and maps the word to a state field.

Additionally, the mapper 228 may use positional, or ordering, information associated with the received response to determine the meaning of a word. For example, because the word "Minneapolis" is spoken before a state and after a street address, the text to UI mapper 228 determines that the word is a city and maps it to a city field. Also, the text to UI mapper 228 may recognize a five digit number positioned at the end of the address information is a zip code, and thus maps "55402" to a zip code field.

As indicated by the address information example, the remote client 202 can use the host calling service to provide various services to a user. In additional examples, the remote client 202 uses the hosted calling service to authenticate a user, verify the uniqueness of a user, provide convenient UI for users (e.g., visually impaired users, users with intermittent access to a computer, etc.)

In an expansion of the above described examples, the remote client 202 can use the host calling service to authenticate a user by requesting the server 102 call a phone number provided by the user and query the user whether a request (e.g., reset of a password) is legitimate. In an example of verifying the uniqueness of a user, the remote client 202 can use the host calling service to call a telephone number provided by a user to validating whether the user entering the telephone number has access to the device associated with the number.

In an example of providing a convenient UI for users, the remote client 202 accepts the formatted responses and maps them to UI fields instead of accepting input from the user computing device. This may be beneficial when the user computing device has a small screen (e.g., a handheld device screen, a smart phone screen, a cell phone screen, etc.). Here, using the telephone device 206 may be more convenient than trying to enter information into a UI displayed on the small screen.

In another example of providing a convenient UI, the user may be attempting to fill in a form that includes many branches (e.g., the generation of some questions may depend on previous answers). If the user computing device 126 is a mobile device, such as cell phone browser, the reloading, or refreshing, of the form after every branch can take a long time. By calling the user via the PSTN, the user may be able to enter the required information quicker because the need to refresh the form may be eliminated.

In the depicted example, the system 200 may not require the remote client 202 to know how the server 102 performs the calling service. Instead, the remote client 202 may use the calling service by passing a set of known parameters to the standardized interface of the server 102. For example, the remote client 202 can be configured to use an HTTP interface to send messages to the server 102 that include a phone number and a URI to play back an audio file during a generated call. By passing messages to with the server 102 via the HTTP request and messaging protocol, the remote client 202 can initiate the calls.

In some implementations, the server 102 accepts additional control commands from the remote client 202 after a call has been initiated by the server 102. For example, the remote client 202 can, through the standardized interface 212, control which playback messages are used (e.g., control an audio call menu presented to the telephone device 206), thresholds for response times, how a user's responses are decoded, and/or terminate the call.

In some implementations, the system 200 may also provide a crank-call avoidance service that reduces crank calls to users from the system 200. Systems and methods for preventing crank-callings are described in co-pending and jointly-owned U.S. patent application Ser. No. 11/479,943 entitled, "Crank Call Avoidance," by Peretz, et al., filed Jun. 30, 2006, the entirety of which is incorporated by reference here.

In certain implementations, the remote client 202 receives a phone number from a user of, for example, the user computing device 126, as shown by the arrow A. The remote client 202 can immediately generate a call request 108 using the provided phone number, or the remote client 202 can generate the call 108 request at some future time using the provided phone number.

In the depicted example of FIG. 2, the remote client 202 sends the call request 108 to the standardized interface 212, as shown by an arrow labeled B. As shown in FIG. 2, the call request can include, inter alia, a user phone number, an audio file, or a URI to an audio file.

After receiving the call request, the calling module 114 can generate a call 116 with the specified audio file to the telephone device 206, as shown by an arrow labeled C. When the user answers the phone, the calling module 114 can start playing the audio file to the user. Additionally, as shown by an arrow labeled D, the server 102 can collect responses 118 from the telephone device 206 in the form of verbal responses, DTMF responses, or a disconnection to the call.

The remote client 202 can send one or more status requests to the server as shown by an arrow labeled E. In response, the server 102 can return, as shown by an arrow labeled F, messages, such as formatted responses gathered from the telephone device 206. For example, the formatted response 120 may include one or more decoded DTMF responses, one or more translated voice responses, a calling status representing a state (e.g., disconnected, connected, connecting, busy, etc.) of the call, and a call identifier of the call, which can be a unique number associated with the call for identification purposes. In some implementations, the remote client 202 can use the returned response to control the flow of a call menu, an example of which is described in more detail below.

Figure 3:
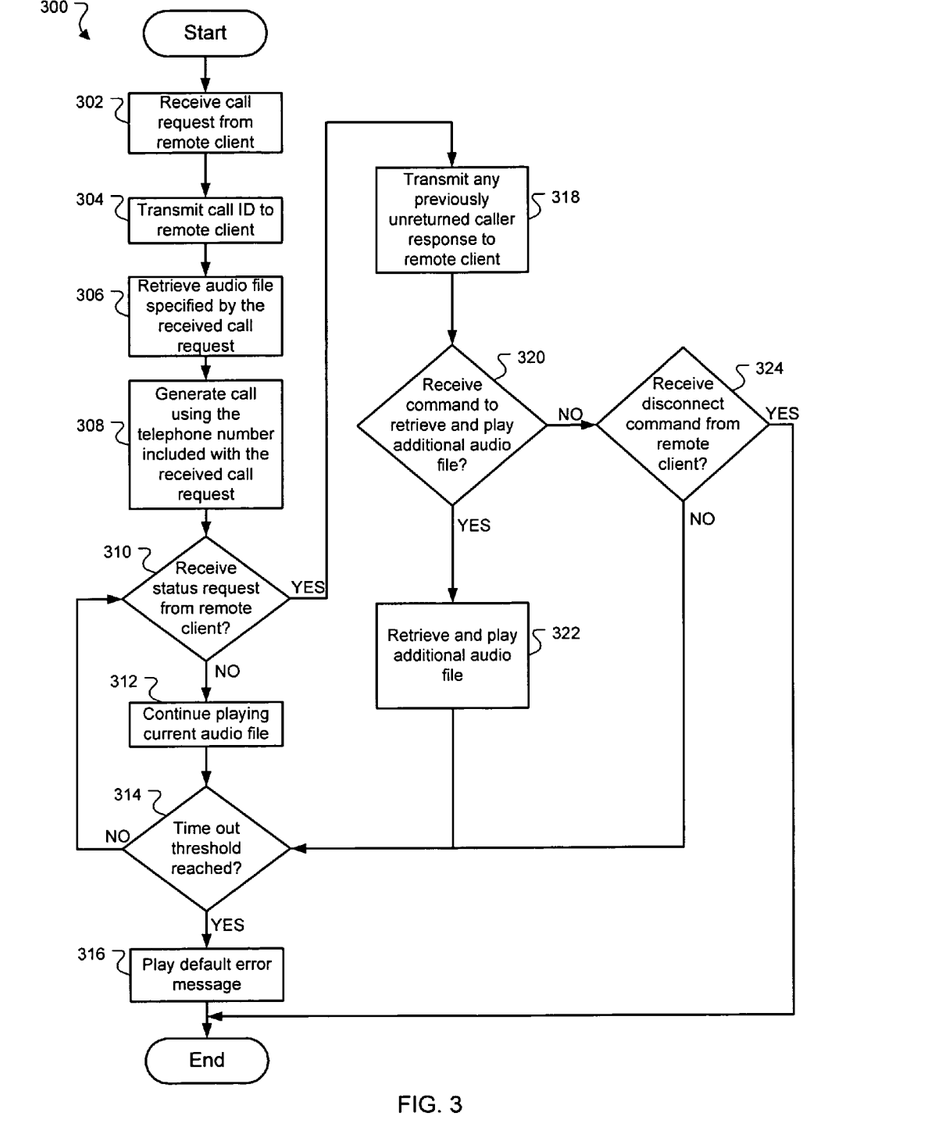
FIG. 3 is a flowchart showing an example of a method for generating and managing an automatically dialed call.

FIG. 3 is a flowchart showing an example of a method 300 for generating and managing an automatically dialed call. In certain implementations, the method 300 can be performed by a server, such as the server 102 of FIGS. 1 and 2. The method 300 begins when the server receives a call request from a remote client in step 302. For example, the server 102 can receive a call request 108 via the standardized interface 212 as shown in FIG. 2. In certain implementations, the call request includes a telephone number and a URI specifying a location of an audio file.

The server can transmit, in step 304, a call ID to the remote client. For example, the server 102 can transmit a unique ASCII call ID that identifies the call request.

In step 306, the server retrieves an audio file specified by the received call request. For example, the server 102 uses the URI to retrieve the audio file from the specified location.

In step 308, the server generates a to a telephone device call using the telephone number included with the received call request. In certain implementations, the server plays the retrieved audio file to a user when the user answers the call. The server can begin collecting DTMF responses and/or verbal responses from the user after the call is connected.

In step 310, the server determines whether a status request is received from the remote client. For example, the remote client 202 can transmit a status request to the server 102 as indicated by the arrow E in FIG. 2. If the server determines that a status request is not received from the remote client, the server, in step 312, continues to play the current audio file.

In step 314, the server determines whether a time out threshold is reached. In certain implementations, the time out threshold is a specified time that the server 102 is configured to wait after a call is established with the telephone device 206 before assuming the call is unsuccessful (e.g., disconnected, no response from user, etc.)

In other implementations, the time out threshold is a specified time that the server is configured to wait for a user response or a message from the remote client after the current audio file ends. When the server waits longer than the predetermined period of time (e.g., 15 seconds) without receiving a user response or a command from the remote client, the server can determine that the time out threshold is reached.

If the server determines that the time out threshold is reached, the server can play a default error message (e.g., "You have not responded. Good-bye.") to the user of the telephone in step 316, and the method 300 ends. In step 314, if the server determines that the time out threshold is not reached, the step 310 is repeated.

In step 310, if the server determines that a status request is received from the remote client, the server can, in step 318, transmit any previously unreturned caller response(s) to the remote client. In certain implementations, the remote client polls the server using a status request including the call ID of the call request. The server can then transmit to the remote client, for example, previously untransmitted decoded DTMF responses, decoded verbal responses, and a call state indicating whether the call is still active.

In step 320, the server determines whether a command is received to retrieve and play additional audio file. For example, the remote client can transmit an HTTP request containing another URI specifying a location of another audio file for the audio player 214 to play to the telephone device 206.

In certain implementations, the remote client sends a request to the server including the call ID of the call request and a URI of the additional audio file. If the server determines that a command to play an additional file is received, then the server retrieves and plays the additional audio file in step 322, and the step 314 is repeated.

If a command to play another audio file is not received, the server can, in step 324, determine whether a disconnect command has been received from the remote client. For example, the remote client 202 can send a terminate call HTTP request including a disconnect command and the call ID of the call request to the server 102. If the server determines that a disconnect command is received, the method 300 ends. If, in step 324, the server determines that a disconnect command has not been received, the step 314 is repeated.

Figure 4:
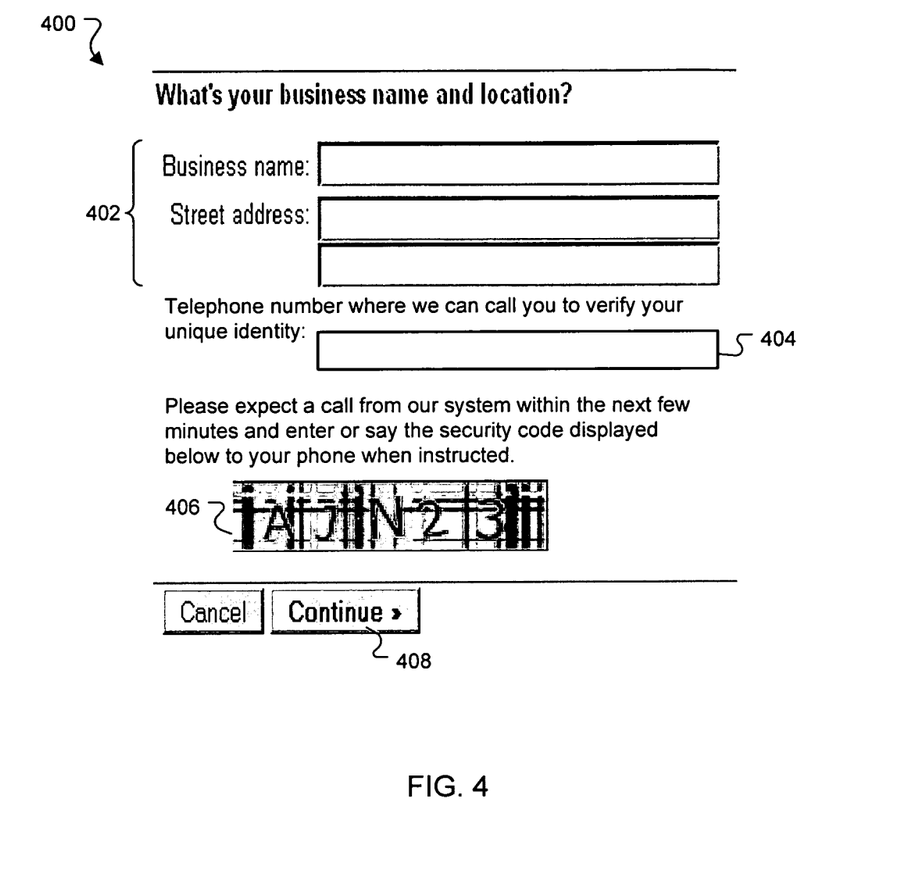
FIG. 4 is an illustrative screenshot of a user interface that a user can use to register a business from a remote client.

FIG. 4 is an illustrative screenshot of a user interface that a user can use to register a business from a remote client. Using a display 400, the user can use, for example, the user computing device 126 to register a business name and an address 402 with the remote client 104.

The display 400 also includes an input box 404 for the user to enter a telephone number to verify the unique identify of the user. Using the server 102, the remote client initiates a call to the user that includes a query used to verify the user's uniqueness in order to prevent or mitigate abuse of the service.

For example, the remote client 104 can verify whether the user is a human (as opposed to a software program that imitates the behavior of a human) via a challenge-response test. One example of such test is a "completely automated public Turing test to tell computers and humans apart" (CAPTCHA) test. As shown in FIG. 4, a CAPTCHA code 406 is shown. The CAPTCHA code 406 shows letters and numbers in a distorted image so that a human can decipher the text but a computer program cannot. By displaying the CAPTCHA code 406 and requiring a registering user to report the displayed letters and numbers via the phone interface, the remote client can validate that a registering user is an actual unique human being.

To register a business, the user enters a business name and a street address 402 in corresponding input boxes. Additionally, the user enters a unique telephone number (where the telephone number can be checked for uniqueness by the remote client or the server device) in the input box 404.

After the user selects a continue button 408, the entered information can be transmitted to the remote client 104. The remote client can verify the unique identity of the registering user by sending a call request with the entered telephone number to the server 102. The server 102 can call the telephone number and request that the user enter or speak the displayed CAPTCHA code 406. The server 102 can collect responses from the telephone device 206 and can transmit one or more formatted responses to the remote client 104.

In certain implementations, if the receiver of the call responds with an answer that matches the CAPTCHA code 406, the remote client 104 validates the unique identity of the use and accepts the business name and street address information that was entered by the user. Otherwise, the remote client 104 can reject the attempt by the user to register the business.

Figure 5:
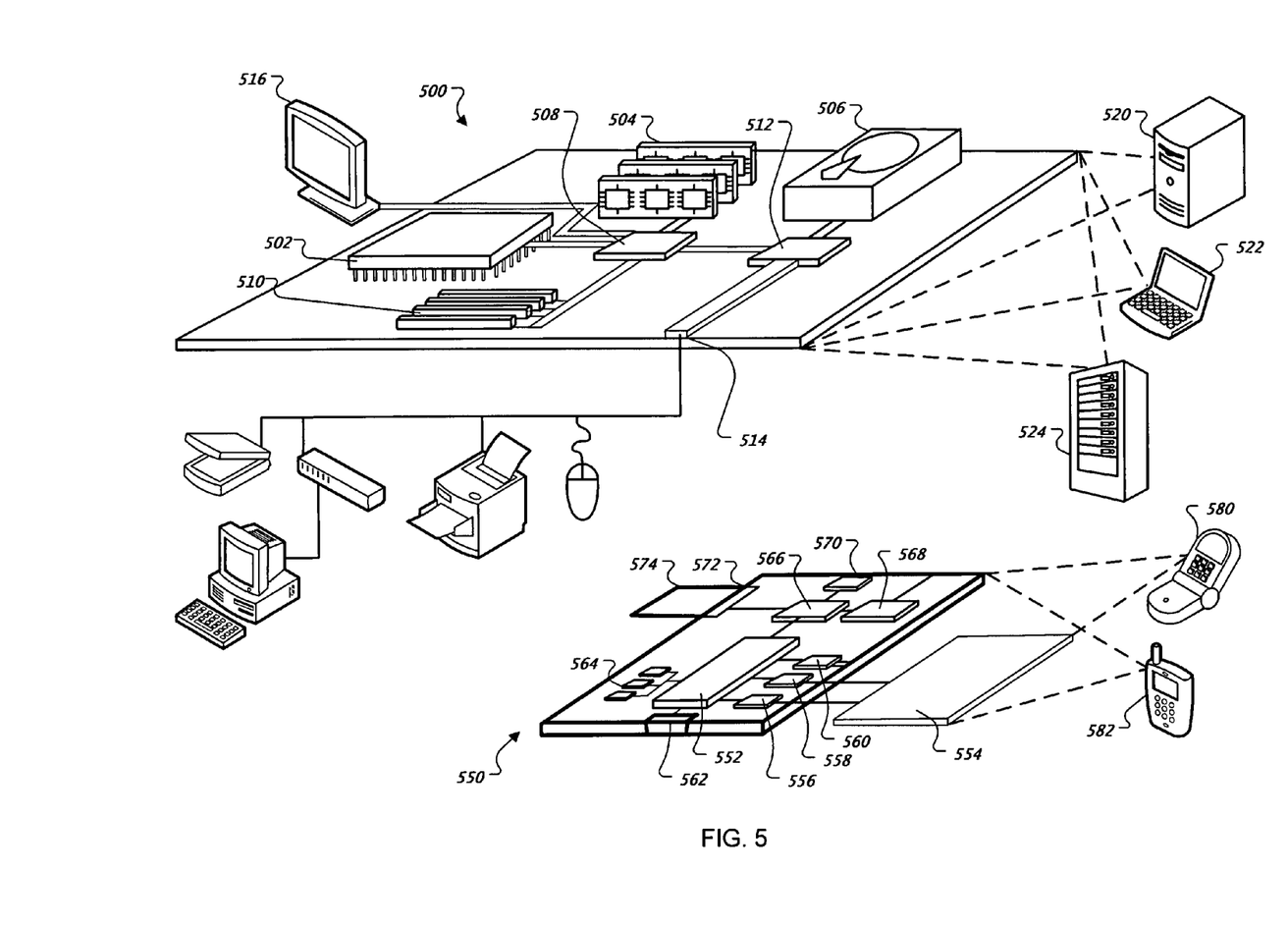
FIG. 5 is a block diagram of computing devices that may be used to implement the systems and methods described in this document.

FIG. 5 is a block diagram of computing devices 500, 550 that may be used to implement the systems and methods described in this document, as either a client or as a server or plurality of servers. For example, the computing device 500 can be included in the user computing device 126, the remote client 202, the server 102, or the device 206 in some implementations. The computing device 550 can also be included in the device 206 or the device 112.

Computing device 500 is intended to represent various forms of digital computers, such as laptops, desktops, workstations, personal digital assistants, servers, blade servers, mainframes, and other appropriate computers.

Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication (e.g., via a docking procedure) or for wireless communication (e.g., via Bluetooth or other such technologies).

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communication audibly using audio codec 560, which may receive spoken information from a user and convert it to usable digital information. Audio codex 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the hosted calling feature have been described. Nevertheless, it will be understood that various modifications may be made without departing from the spirit and scope of the described feature. For example, in other implementations of client-specific processing, the remote client 202 can save a user's phone number and later use the phone number to provide a service to the user.

In one example, the remote client 202 can provide a real-time stock quote service to a registered user. The registered user can provide the remote client 202 a phone number and select, for example, a stock and a price threshold for the stock. When the price of the selected stock reaches the price threshold, the remote client 202 can call the user, for example, to inform the user of the stock price or to query whether the user would like to buy the stock. Accordingly, other embodiments are within the scope of the following claims.

What is claimed is:

1. A computer-implemented method comprising:
receiving, at a calling module, using a standardized interface, a call request from a remote client, the standardized interface enabling interoperability between the calling module and heterogeneous remote clients, wherein each of the heterogeneous remote clients comprises a computing system that provides a computer-based service to at least one user for which the computing system verifies an identity of the at least one user by providing a call request to the calling module;
in response to the received call request, identifying, by the calling module, a first message to audibly transmit to a telephone specified by the call request;
generating a telephone call over a telephone network to the telephone specified by the call request and audibly transmitting the identified first message to solicit first information from the person who answers the telephone, wherein the generated telephone call solicits information from a person who answers the telephone, and wherein the remote client uses the solicited information to verify an identity of the person who answered the telephone or an entity for which the person who answered the telephone is a representative or an agent;
providing, by the calling module, the solicited first information to the remote client for client-specific processing;
during the generated telephone call, receiving a command from the remote client to solicit second information through the generated telephone call from the person who answered the telephone;
identifying, by the calling module and based on the received command, a second message, that is different than the first message, to audibly transmit to the telephone to solicit the second information;
audibly transmitting, by the calling module during the telephone call, the identified second message to the telephone through the generated telephone call to solicit the second information; and
providing, by the calling module, the solicited second information to the remote client for client-specific processing;
wherein at least a portion of the client-specific processing is performed after termination of the generated telephone call and comprises verifying, based on at least one of the first information or the second information, an identity of the person or the entity, and wherein the person or the entity is a user of the remote client.

2. The method of claim 1, further comprising receiving call modification information from the remote client used to modify the call to the telephone, wherein the call modification information is received while the telephone call is in progress and identifies a modification to be made to the telephone call the information being based on the client specific processing of the response transmitted to the remote client.

3. The method of claim 2, wherein the call modification information specifies the calling module should play a different message during the generated call from a currently played message.

4. The method of claim 2, wherein the call modification information specifies the calling module should terminate the call.

5. The method of claim 1, wherein the first information received from the telephone comprises a dual tone multifrequency (DTMF) response.

6. The method of claim 5, further comprising translating the DTMF response to text before transmitting it to the remote client.

7. The method of claim 1, wherein the first information received from the telephone comprises a verbal response.

8. The method of claim 7, further comprising translating the verbal response to text before transmitting it to the remote client.

9. The method of claim 1, wherein the call request comprises an identifier for a recorded message to be played to the telephone.

10. The method of claim 9, further comprising retrieving the recorded message from a storage location using the identifier.

11. The method of claim 1, wherein the call request comprises a recorded message to be played to the telephone.

12. The method of claim 1, wherein the call request comprises a telephone number of the telephone to be called.

13. The method of claim 1, wherein the remote client is a web server that prompts users to enter information used in generating call requests.

14. The method of claim 1, further comprising receiving from the remote client a status request that prompts the calling module to transmit the first information.

15. The method of claim 14, further comprising transmitting information in response to the status request, the information specifying whether or not the generated call was terminated.

16. The method of claim 14, wherein the transmitted response comprises information not previously transmitted to the remote client.

17. The method of claim 1, further comprising:
in response to the audibly transmitted first message, receiving at least a portion of the solicited first information from the telephone through the generated telephone call;
during the generated telephone call, receiving a status request from the remote client for a status of the call request; and
in response to the status request, providing the remote client with the received portion of the solicited first information, wherein the remote client is configured to determine subsequent actions to take with regard to the call request based upon the received portion of the solicited first information;
wherein the received command is provided by the remote client in response to the portion of the solicited first information being provided to the remote client, and wherein the received command is determined by the remote client based upon the received portion of the solicited first information.

18. The method of claim 1, further comprising:
in response to transmitting the first response to the remote client, receiving a second command to terminate the generated call with the telephone; and
in response to receiving the second command, terminating the generated call with the remote client;
wherein the second command is provided by the remote client based upon client-specific processing of the first response by the remote client.

19. A system comprising:
a standardized client interface configured to receive call requests from heterogeneous remote clients, wherein each of the heterogeneous remote clients comprises a computing system that provides a computer-based service to at least one user for which the computing system verifies an identity of the at least one user by providing a call request to the standardized client interface;
an audio file database to store first messages and second messages to audibly transmit to telephones specified by the call requests, wherein the telephones are separate from the remote clients;
a calling module that is programmed to generate telephone calls over a telephone network to the telephones associated with the call requests, wherein the generated telephone calls solicit information from people who answer the telephones, and wherein the remote clients uses the solicited information to verify identities of the people who answered the telephones or entities for which the people who answered the telephone are representatives or agents; an audio player that is programmed to audibly transmit the identified first messages over the generated telephone calls to solicit first information from the people who answer the telephones;
a calling interface to provide the solicited first information to the remote clients for client-specific processing;
a call manager that is programmed to i) receive, during the generated telephone calls, commands from the remote clients to solicit second information through the generated telephone calls, and ii) identify, based on the received commands, a second message, that is different than the first message, to audibly transmit to the telephones to solicit the second information;
wherein the audio player is further programmed to audibly transmit, during the telephone calls, the identified second messages to the telephones through the generated telephone calls to solicit the second information;
wherein the calling interface is further programmed to provide the solicited second information to the remote clients for client-specific processing; and
wherein at least a portion of the client-specific processing is performed after termination of the generated telephone calls and comprises verifying, based on at least one of the first information or the second information, an identity of the people or the entities, and wherein the people or the entities are users of the remote clients.

20. The system of claim 19, wherein the call manager is further programmed to receive call modification information from the remote clients that is used to modify the generated telephone calls to the telephones, wherein the call modification information is received while the telephone calls are in progress and identifies modifications to be made to the telephone calls.

21. A system comprising:
a telephone call control module at a remote client to generate telephone call requests for transmission to a standardized interface of a server, wherein the standardized interface of the server is configured to accept telephone call requests from heterogeneous remote clients, wherein the telephone call requests specify telephones that are to be called over a telephone network by the server, wherein each of the heterogeneous remote clients comprises a computing system that provides a computer-based service to at least one user for which the computing system verifies an identity of the at least one user by providing a call request to the calling module, wherein the server is configured to generate telephone calls to the specified telephones over the telephone network in response to receiving the telephone call requests, wherein the telephone calls generated by the server solicit information from people who answers the telephones, and wherein the remote client uses the solicited information to verify identities identity of the people who answered the telephones or entities for which the people who answered the telephones are representatives or agents;

an interface at the remote client to receive, during the generated telephone calls and from the server, first information solicited by the telephone calls;

wherein the telephone call control module is further configured to generate, in response to the first information received by the interface, commands to solicit second information through the generated telephone calls, the generated commands to be transmitted to the server, wherein transmission of the generated commands to the server causes the server to modify the generated telephone calls so as to solicit the second information;

wherein the interface is further configured to receive the solicited second information from the server; and a processing module at the remote client to process at least the second information, wherein processing the second information is performed after termination of the generated telephone calls and comprises verifying an identity of the people or the entities based on at least one of the first information or the second information, and wherein the people or the entities are users of the remote client.

22. A computer program product tangibly embodied in a computer-readable storage device, the computer program product including instructions that, when executed, perform operations comprising:

receiving, at an interface, a call request from a remote client, the interface enabling interoperability between a calling module and heterogeneous remote clients, wherein each of the heterogeneous remote clients comprises a computing system that provides a computer-based service to at least one user for which the computing system verifies an identity of the at least one user by providing a call request to the calling module;

in response to the received call request, identifying, by the calling module, a first message to audibly transmit to a telephone specified by the call request;

generating a telephone call over a telephone network to the telephone specified by the call request and audibly transmitting the identified first message over the generated telephone call to solicit first information from the person who answers the telephone, wherein the generated telephone call solicits information from a person who answers the telephone, and wherein the remote client uses the solicited information to verify an identity of the person who answered the telephone or an entity for which the person who answered the telephone is a representative or an agent;

providing, by the calling module, the solicited first information to the remote client for client-specific processing;

during the generated telephone call, receiving a command from the remote client to solicit second information through the generated telephone call from the person who answered the telephone;

identifying, by the calling module and based on the received command, a second message, that is different than the first message, to audibly transmit to the telephone to solicit the second information;

audibly transmitting, by the calling module during the telephone call, the identified second message to the telephone through the generated telephone call to solicit the second information; and providing, by the calling module, the solicited second information to the remote client for client-specific processing;

wherein at least a portion of the client-specific processing is performed after termination of the generated telephone call and comprises verifying, based on at least one of the first information or the second information, an identity of the person or the entity, and wherein the person or the entity is a user of the remote client.

* * * * *

UNITED STATES PATENT AND TRADEMARK OFFICE
CERTIFICATE OF CORRECTION

PATENT NO. : 8,417,791 B1
APPLICATION NO. : 11/480279
DATED : April 9, 2013
INVENTOR(S) : Ervin Peretz, Jennifer W. Braithwaite and Scott R. Ludwig It is certified that error appears in the above-identified patent and that said Letters Patent is hereby corrected as shown below:

In the Claims:

Column 16, lines 38-39, in Claim 19, delete "an identity" and insert -- identities --, therefor.

Column 16, line 67, in Claim 21, after "identities" delete "identity".

Column 17, line 19, in Claim 21, delete "an identity" and insert -- identities --, therefor.

Signed and Sealed this
Second Day of July, 2013

Teresa Stanek Rea
*Acting Director of the United States Patent and Trademark Office*